US009883533B2

(12) United States Patent
Fröberg Olsson et al.

(10) Patent No.: US 9,883,533 B2
(45) Date of Patent: Jan. 30, 2018

(54) LISTEN-BEFORE-TALK FOR DISCOVERY SIGNAL IN LICENSE-ASSISTED ACCESS LTE (71) Applicant: Telefonaktiebolaget L M Ericsson (publ), Stockholm (SE)

(72) Inventors: Jonas Fröberg Olsson, Ljungsbro (SE); Håkan Andersson, Linköping (SE); John Skördeman, Brokind (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 68 days.

(21) Appl. No.: 14/783,320

(22) PCT Filed: Sep. 18, 2015

(86) PCT No.: PCT/EP2015/071499
§ 371 (c)(1),
(2) Date: Oct. 8, 2015

(87) PCT Pub. No.: WO2016/046093
PCT Pub. Date: Mar. 31, 2016

(65) Prior Publication Data
US 2016/0262183 A1 Sep. 8, 2016

Related U.S. Application Data (60) Provisional application No. 62/055,709, filed on Sep. 26, 2014.

(51) Int. Cl.
*H04W 4/00* (2009.01)
*H04W 74/08* (2009.01)
(Continued)

(52) U.S. Cl.
CPC ....... *H04W 74/0808* (2013.01); *H04W 24/08* (2013.01); *H04W 48/08* (2013.01);
(Continued)

(58) Field of Classification Search
CPC . H04W 74/0808; H04W 24/08; H04W 48/08; H04W 48/16; H04W 72/0446
See application file for complete search history.

(56) References Cited

U.S. PATENT DOCUMENTS

2012/0106465 A1* 5/2012 Haghighat ........ H04W 72/1289
370/329
2013/0083753 A1* 4/2013 Lee ................... H04W 72/0453
370/329
(Continued)

FOREIGN PATENT DOCUMENTS

WO WO 2013/167557 A1 11/2013

OTHER PUBLICATIONS

3GPP, Technical Specification, "3rd Generation Partnership Project; Technical Specification Group Radio Access Network; Evolved Universal Terrestrial Radio Access (E-UTRA); Physical channels and modulation (Release 11)", 3GPP TS 36.211 V11.6.0 (Sep. 2014), 120 pp.
(Continued)

*Primary Examiner* — Abdelnabi O Musa
(74) *Attorney, Agent, or Firm* — Sage Patent Group (57) ABSTRACT A method by a user equipment is disclosed for decoding data from a network node in a telecommunications system. The method includes determining whether a discovery signal was received from the network node by detecting of another signal received from the network node, which may be a Primary Synchronization Signal (PSS) and/or a Secondary Synchronization Signal (SSS). Based on detecting that the another signal was received, the method includes determining whether a grant is present based on processing an Evolved Physical Downlink Control CHannel, ePDCCH. Based on determining that a grant is present, the method
(Continued)

includes decoding a Physical Downlink Shared Channel, PDSCH, using the ePDCCH and the discovery signal.

19 Claims, 6 Drawing Sheets

(51) Int. Cl.
    *H04W 48/08*     (2009.01)
    *H04W 24/08*     (2009.01)
    *H04W 72/04*     (2009.01)
    *H04W 48/16*     (2009.01)
    *H04W 72/12*     (2009.01)

(52) U.S. Cl.
    CPC ........ *H04W 72/0446* (2013.01); *H04W 48/16* (2013.01); *H04W 72/1289* (2013.01)

(56) References Cited

U.S. PATENT DOCUMENTS

| | | | |
|---|---|---|---|
| 2014/0050192 A1* | 2/2014 | Kim | H04L 5/001 370/329 |
| 2016/0007307 A1* | 1/2016 | Wei | H04W 56/001 370/328 |
| 2016/0073366 A1* | 3/2016 | Ng | H04W 56/001 370/329 |
| 2016/0174247 A1* | 6/2016 | Ruiz Delgado | H04W 72/1273 370/329 |

OTHER PUBLICATIONS

3GPP, Technical Specification, "3rd Generation Partnership Project; Technical Specification Group Radio Access Network; Evolved Universal Terrestrial Radio Access (E-UTRA); Physical layer procedures (Release 11)", 3GPP TS 36.213 V11.11.0 (Jun. 2015), 183 pp.

3GPP, Technical Specification, "3rd Generation Partnership Project; Technical Specification Group Radio Access Network; Evolved Universal Terrestrial Radio Access (E-UTRA); Radio Resource Control (RRC); Protocol specification (Release 11)", 3GPP TS 36.331 V11.13.0 (Sep. 2015), 359 pp.

3GPP TS 36.111, V11.3.0, Jun. 2014, $3^{rd}$ Generation Partnership Project: Technical Specification Group Radio Access Network; Location Measurement Unit (LMU) performance specification; Network based positioning systems in Evolved Universal Terrestrial Radio Access Network (E-UTRAN) (Release 11), 32 pages.

3GPP TS 36.213, V11.7.0, Jun. 2014, $3^{rd}$ Generation Partnership Project: Technical Specification Group Radio Access Network; Evolved Universal Terrestrial Radio Access (E-UTRA); Physical layer procedures (Release 11), 182 pages.

3GPP TS 36.331, V11.8.0, Jun. 2014, $3^{rd}$ Generation Partnership Project: Technical Specification Group Radio Access Network; Evolved Universal Terrestrial Radio Access (E-UTRA); Radio Resource Control (RRC); Protocol specification (Release 11), 354 pages.

Ericsson, "Design of the Small cell On/Off scheme for an activated SCell", 3GPP TSG RAN WG1 Meeting #78, Dresden, Germany, Aug. 18-22, 2014, 6 Pages.

Huawei, HiSilicon, "Remaining aspects for small cell discovery signal design", 3GPP TSG RAN WG1, #78, Dresden, Germany, R1-143499, Aug. 18-22, 2014, , 6 Pages.

Huawei, HiSilicon, "Summary of offline discussions on detailed design of discovery signal", 3GPP TSG RAN WG1 #78, Dresden, Germany, R1-143433, Aug. 18-22, 2014, 3 Pages.

International Search Report and Written Opinion Corresponding to International Application No. PCT/EP2015/071499; dated Oct. 10, 2015; 14 Pages.

ZTE "Small cell discovery signal—Efficient operation of small cells", 3GPP TSG-RAN WG1 Meeting #74bis, Guangzhou, China, Oct. 7-11, 2013, R1-134325, 8 Pages.

* cited by examiner

LISTEN-BEFORE-TALK FOR DISCOVERY SIGNAL IN LICENSE-ASSISTED ACCESS LTE

CROSS REFERENCE TO RELATED APPLICATIONS

This application is a 35 U.S.C. §371 national stage application of PCT International Application No. PCT/EP2015/071499, filed on Sep. 18, 2015, which itself claims priority to U.S. provisional Application No. 62/055,709, filed Sep. 26, 2014, the disclosure and content of both of which are incorporated by reference herein in their entirety.

TECHNICAL FIELD

The present disclosure is directed to communications and, more particularly, to wireless communication methods, networks, and network nodes.

BACKGROUND

Reference signals are used in most wireless communication systems for various purposes such as:
Obtaining time and frequency synchronization;
Enabling a user equipment (UE) to measure channel quality and demodulate data; and/or
Discovering network or transmission points In the 3rd-Generation Partnership Project (3GPP) so-called Long-Term Evolution (LTE) systems, almost all reference signals are sent periodically. The UE knows the periodicity and the subframe number offset for the reference signals either by specification or by configuration. For example, the Primary Synchronization Signal (PSS) and Secondary Synchronization Signal (SSS) are sent with a periodicity of 5 ms and with a subframe offset of 0, i.e., PSS/SSS are sent in subframes (SF) whose subframe number fulfills the condition:

$$SF(\mod 5)=0.$$

Another example is Channel-State Information Reference Signals (CSI-RS) measurement resources, where a UE is configured to estimate channel properties based on a specific CSI-RS transmitted at specific time instances, which are determined by a subframe period (SF_period) and a subframe offset (SF_offset). The standard supports various values for SF_period and SF_offset. For example, SF_offset=4 and SF_period=20 is one possible configuration which means that a UE should estimate the channel in subframes that fulfill the condition:

$$SFN*10+SF(\mod SF\_period)=SF\_offset,$$

where SFN is the system frame number (SFN is incremented each time SF wraps, i.e., every time SF goes from 9 to 0).

License-Assisted Access via LTE (LAA-LTE) has recently been proposed as a technology for coexistence on unlicensed carriers with, e.g., WiFi. On an unlicensed carrier all data transmissions are to be controlled by a Listen-Before-Talk (LBT) mechanism, while control and management signaling can be sent without LBT at a maximum duty cycle of 5% within an observation period of 50 ms. The LBT is a functionality which means that the channel is assessed to be clear before transmission begins. Since CSI-RS can be considered a type of control/management signaling, LAA-LTE may send a discovery signal (a.k.a. beacon signal) including required reference signals, such as PSS, SS, and/or extended Synchronization Signal (eSS) and possibly also CSI-RS without LBT, and may hence preserve the periodicity of the reference signals.

The approaches described in the Background section could be pursued, but are not necessarily approaches that have been previously conceived or pursued. Therefore, unless otherwise indicated herein, the approaches described in the Background section are not prior art to the claims in this application and are not admitted to be prior art by inclusion in the Background section.

SUMMARY

Some embodiments of the present disclosure are directed to a method by a user equipment (UE) for decoding data from a network node in a telecommunications system. The method includes determining whether a discovery signal received from the network node based on detection of another signal received from the network node. Based on detecting that the another signal was received, the method determines whether a grant is present based on processing an Evolved Physical Downlink Control CHannel, ePDCCH. Based on determining that a grant is present, the method decodes a Physical Downlink Shared Channel, PDSCH, using the ePDCCH and the discovery signal.

In some further embodiments, the determination of whether a discovery signal was received from the network node is based on detection of a Primary Synchronization Signal, PSS, and/or a Secondary Synchronization Signal, SSS, as the another signal received from the network node.

A potential advantage of one or more of these embodiments is that the UE can accurately decode data while the discovery signal is transmitted aperiodically and with or without a LBT mechanism. When a discovery signal is determined to have been received, the PDSCH can be accurately decoded using the discovery signal and the ePDCCH, which can be rate-matched around the discovery signal and the ePDCCH.

Some other embodiments of the present disclosure are directed to a UE operating in a telecommunications system. The UE includes a transceiver and a processor. The transceiver is configured to provide radio communications with a network node of the telecommunications system. The processor is coupled to the transceiver and is configured to determine whether a discovery signal was received from the network node through the transceiver based on detection of another signal received from the network node. Based on detecting that the another signal was received, the processor determines whether a grant is present based on processing the ePDCCH. Based on determining that a grant is present, the processor decodes the PDSCH using the ePDCCH and the discovery signal.

Some other embodiments of the present disclosure are directed to a UE operating in a telecommunications system. The UE is adapted to determine whether a discovery signal was received from the network node through the transceiver based on detection of another signal received from the network node. Based on detecting that the another signal was received, the UE is adapted to determine whether a grant is present based on processing the ePDCCH. Based on determining that a grant is present, the UE is adapted to decode the PDSCH using the ePDCCH and the discovery signal.

Other methods, UEs, and systems according to embodiments of the invention will be apparent to one with skill in the art upon review of the following drawings and detailed description. It is intended that all such additional methods, UEs, and systems be included within this description, be within the scope of the present invention, and be protected by the accompanying claims. Moreover, it is intended that all embodiments disclosed herein can be implemented separately or combined in any way and/or combination.

BRIEF DESCRIPTION OF THE DRAWINGS

The accompanying drawings, which are included to provide a further understanding of the disclosure and are incorporated in and constitute a part of this application, illustrate certain non-limiting embodiment(s) of inventive concepts. In the drawings.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

Although various embodiments are disclosed herein in the context of being performed by a UE and/or a network node, they are not limited thereto and instead can be performed in any type of electronic communication device or system.

Potential Problems with Existing Approaches

Problems can arise due to sending reference signals as control signaling without LBT. For example, sending control signaling without LBT is generally unfriendly to other devices using the spectrum in spite of governmental regulation permitting such interference. The quality of the measurements for time and frequency synchronization may be degraded when there is no LBT since another transmitter, e.g. WiFi, may have accessed the channel during the same measurement period. The quality of the measurement for discovery of network or transmission points may suffer when there is no LBT since another transmitter, e.g. WiFi, may have accessed the channel during the measurement period. Moreover, if reference signals for CSI measurements are included in the discovery signal these measurements may suffer when there is no LBT since another transmitter, e.g. WiFi, may have accessed the channel during the measurement period. A UE typically relies on a sequence of CSI measurements and may apply filtering over time. Hence, the reported CSI may repeatedly be less accurate if another transmitter has accessed the channel during one, or several, of the CSI measurement instances.

Embodiments of the Present Disclosure May Overcome these Potential Problems

Embodiments of the present disclosure may overcome one or more of the potential problems explained above with existing approaches by relaxing the constraints of the CSI-measurement resource configuration by the UE monitoring the sync signals (e.g., PSS and/or SSS) at predefined intervals. Alternatively, the UE can continuously monitor the sync signals (e.g., PSS and/or SSS).

A potential advantage of one or more embodiments of the present disclosure is that the discovery signal can be transmitted aperiodically and using an LBT mechanism. Additionally, data can be sent simultaneously with the discovery signal.

UE Operations and Methods According to Embodiments of the Present Disclosure

Figure 1:
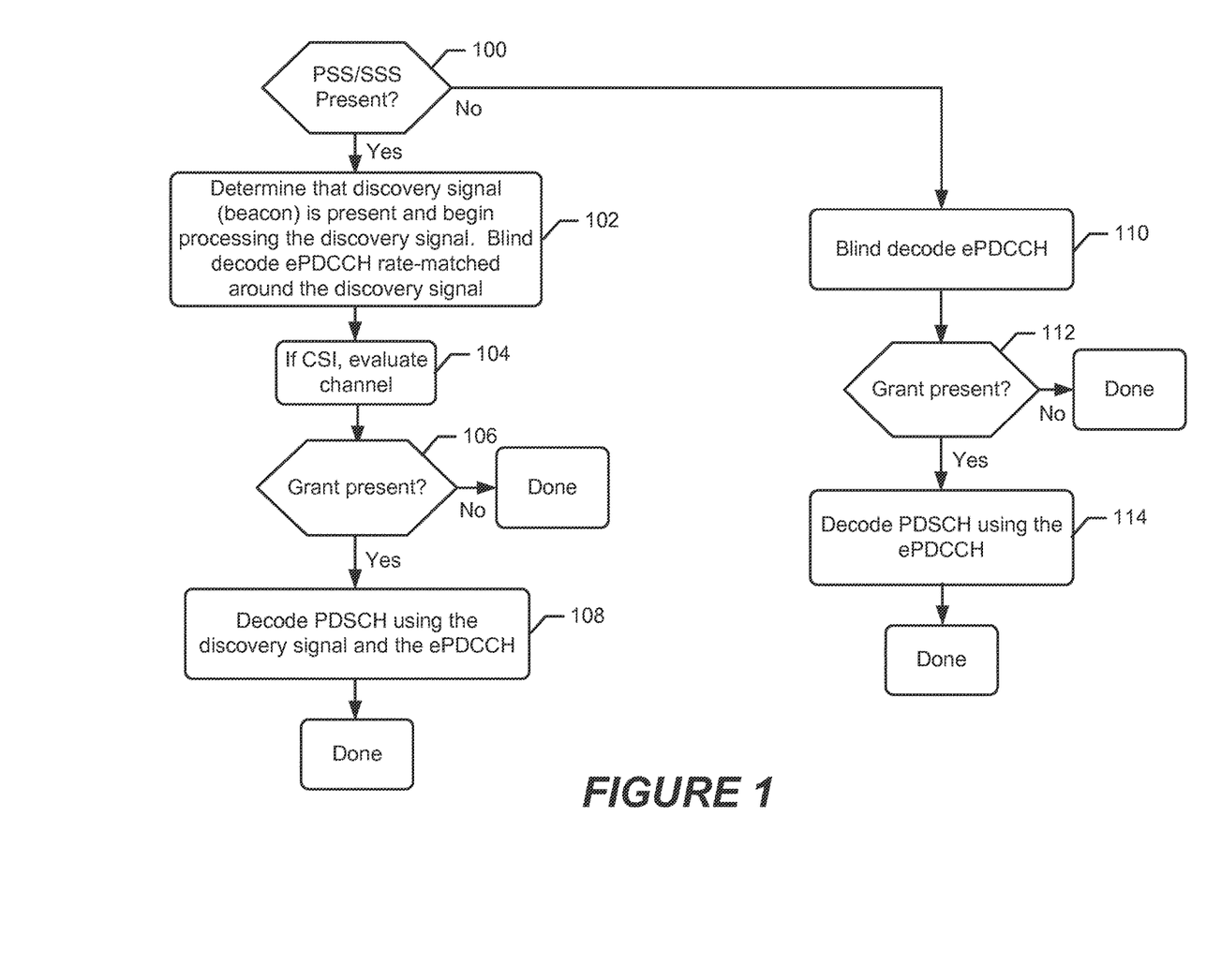
FIG. 1 is a flowchart of operations and methods by a UE configured according to some embodiments.

FIG. 1 is a flowchart of operations and methods by a UE configured according to some embodiments. Referring to FIG. 1, the UE determines (block 100) if a defined signal, e.g., PSS and/or SSS, is received from a network node. The determination may be performed every SubFrame (SF) or at predefined intervals.

Based on PSS and/or SSS being determined to have been received from the network node, the UE determines therefrom that a discovery signal is present and begins processing (block 102) the discovery signal. Although various embodiments are described in the context of the discovery signal being determined to have been received based on detection of PSS and/or SSS received from the network node, the discovery signal may be determined to have been received based on receiving another signal having a defined characteristic from the network node. Processing of the discovery signal can include blind decoding of an Evolved Physical Downlink Control CHannel (ePDCCH) which is rate-matched around the discovery signal. If CSI is present, the UE can evaluate (block 104) the channel.

The processing of the discovery signal includes determining (block 106) whether a grant is present based on processing the ePDCCH. The grant may identify subframe(s) where CSI-measurement resources are present and to be used by the UE to measure CSI.

Based on determining that a grant is present, the UE decodes (block 108) the PDSCH and the discovery signal, which can be rate-matched around the ePDCCH and around the discovery signal.

In contrast, when the UE determines (block 100) that a received signal does not comprise PSS and/or SSS from a network node, the UE blindly decodes (block 110) the ePDCCH. The UE determines (block 112) from the decoding whether a grant is present. When a grant is present, the UE decodes (block 114) the PDSCH using the ePDCCH, which can be rate-matched around the ePDCCH.

In some embodiments the reference signals for CSI measurements are included in the discovery signal. In such embodiments the UE is configured with zero-power CSI-RS resources to match the CSI-RS that are transmitted in the discovery signal, which means that if the discovery signal is present the UE rate matches the PDSCH around the configured zero-power CSI-RS. In such embodiments the CSI-RS measurement and CSI-IM resources are configured to coincide with the transmissions of the discovery signal.

In some other embodiments, the UE is configured to expect that the discovery signal may be sent at periodic instances in time, but that it is not always sent at these periodic time instances. The latter would correspond to occasions when the LBT mechanism did not give the eNB permission to access the medium. In such embodiments, a UE can detect if the discovery signal was sent or not based on detection of the PSS and/or SSS of the network node(s).

Figure 2A:
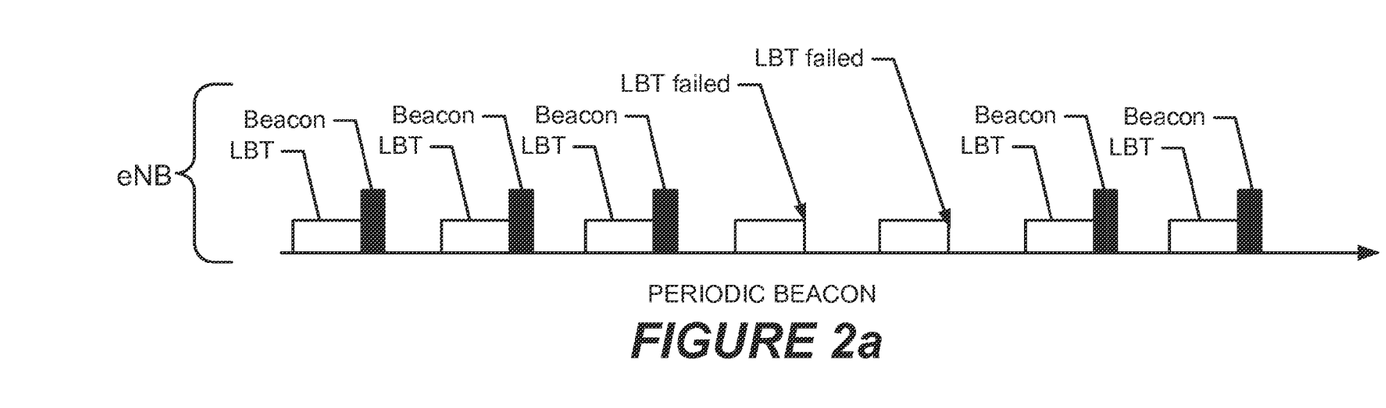
FIG. 2a illustrates an operation and signaling timing diagram of a periodic LBT-controlled transmission of the discovery signal (beacon) from an eNB or other network node.
Figure 2B:
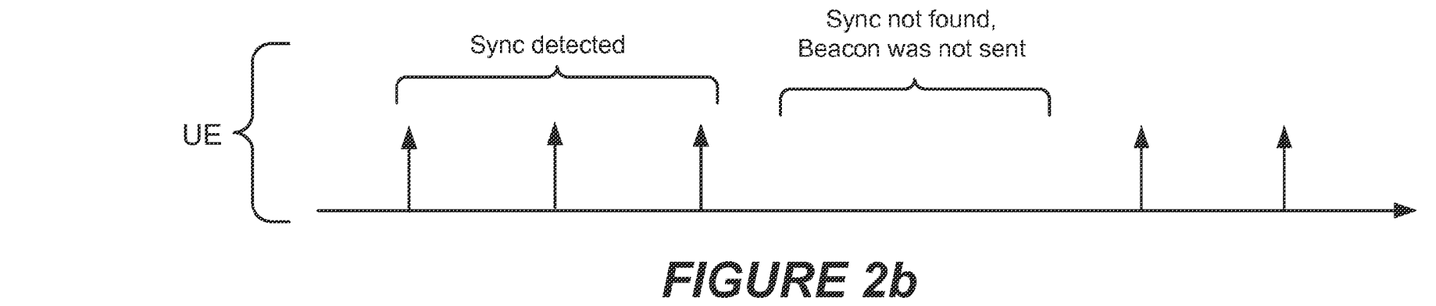
FIG. 2b illustrates an operation timing diagram in which a UE detects the discovery signal (beacon) through detection of the synchronization signals. according to some embodiments.

FIG. 2a illustrates an operation and signaling timing diagram of a periodic LBT-controlled transmission of the discovery signal (beacon) from an eNB or other network node. FIG. 2b illustrates a corresponding operation timing diagram in which a UE detects the discovery signal (beacon) through detection of the synchronization signals. FIGS. 2a-b illustrate that at periodic time instances the discovery signal (beacon) is sent, if allowed by the LBT mechanism ("LBT" time interval); or it is not sent, if denied by the LBT mechanism ("LBT failed" following the "LBT" time interval).

Figure 3A:
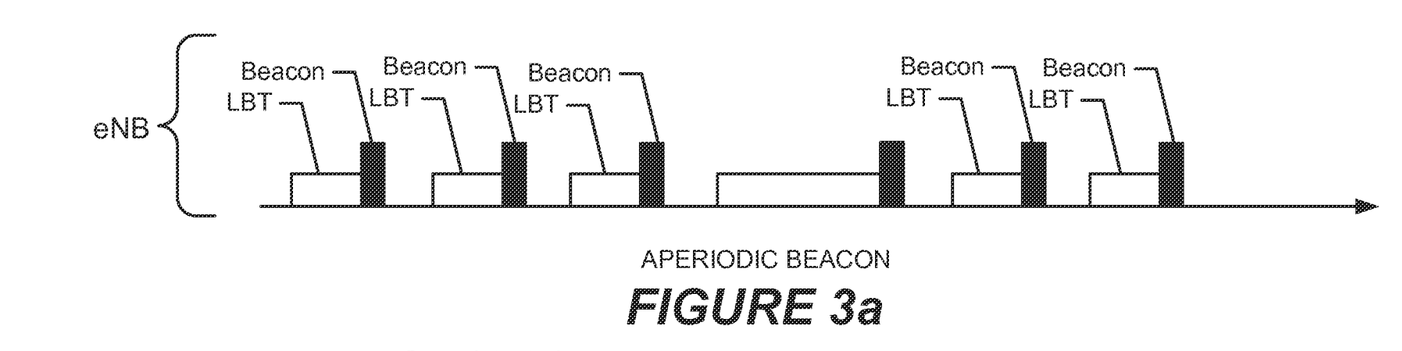
FIG. 3a illustrates an operation and signaling timing diagram of an LBT-controlled aperiodic transmission of the discovery signal (beacon) from an eNB or other network node.
Figure 3B:
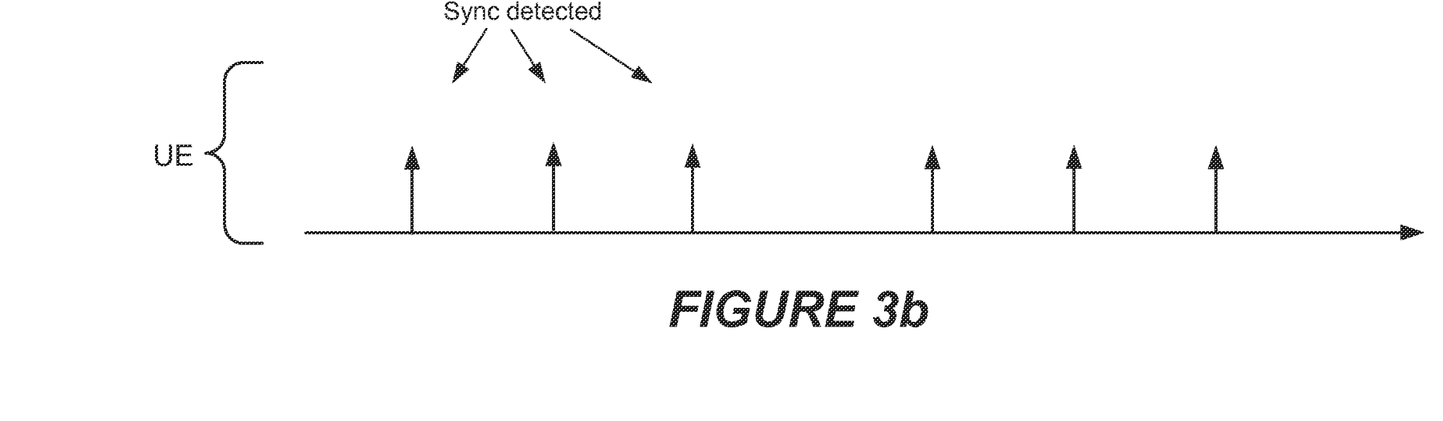
FIG. 3b illustrates an operation timing diagram in which a UE detects a discovery signal by detection of the synchronization signal(s) according to some embodiments.

FIG. 3a illustrates an operation and signaling timing diagram of an LBT-controlled aperiodic transmission of the discovery signal (beacon) from an eNB or other network node. FIG. 3b illustrates a corresponding operation timing diagram in which a UE detects a discovery signal by detection of the synchronization signal(s) according to some embodiments. FIGS. 3a-b illustrate that the discovery signal can be sent at any time (within subframe boundaries) if allowed by the LBT mechanism.

Various embodiments of the present disclosure are applicable to a LAA-LTE system. As explained above, by using LBT for the discovery signal the quality of the reception can be improved (e.g., with less interference) from other transmissions, and, the UE can determine whether a discovery signal was sent or not based on the detection of the synchronization signals.

Figure 4:
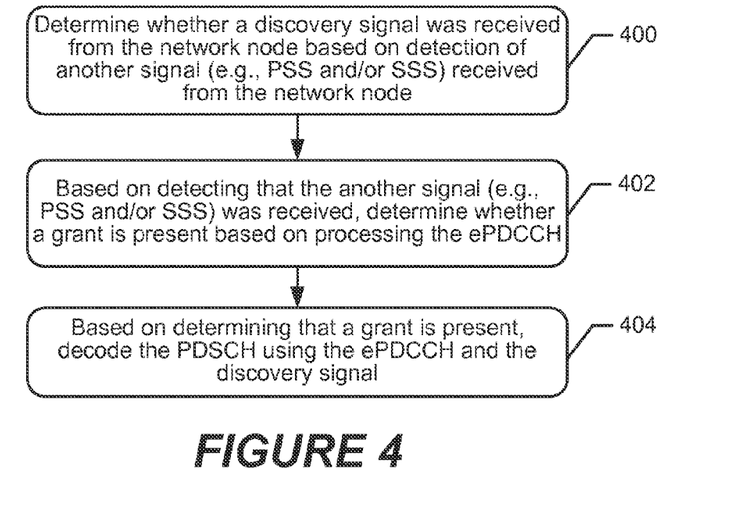
FIGS. 4-7 are flowcharts of operations and methods by a UE configured according to some embodiments.

FIGS. 4-7 are flowcharts of methods and operations by a UE for decoding data from a network node in a telecommunications system, in accordance with some embodiments. Referring to FIG. 4, a determination (block 400) is made whether a discovery signal was received from a network node based on detection of another signal received from the network node. The determination (block 400) may be made based detecting PSS and/or SSS as the another signal received from the network node. Based on determining that the another signal, e.g., PSS and/or SSS, was received, a determination (block 402) is made whether a grant is present based on processing an ePDCCH. Based on determining that a grant is present, a PDSCH is decoded (block 404) using the ePDCCH and the discovery signal, which can be rate-matched around the ePDCCH and around the discovery signal.

The determination (block 400) whether a discovery signal was received from the network node may be performed responsive to occurrence of each SubFrame. Alternatively, the determination (block 400) whether a discovery signal was received from the network node may be performed continuously without timing referenced to any SubFrame.

Figure 5:
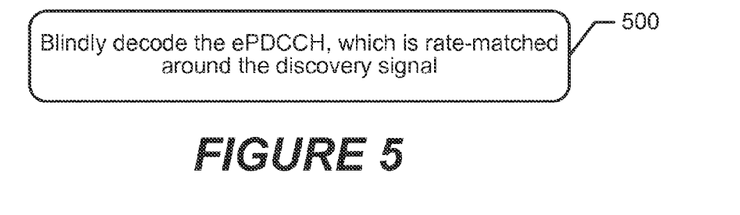

In the embodiment of FIG. 5, the determination whether a grant is present based on processing the discovery signal, includes blindly decoding (block 500) the ePDCCH, which can be rate-matched around the discovery signal.

Figure 6:
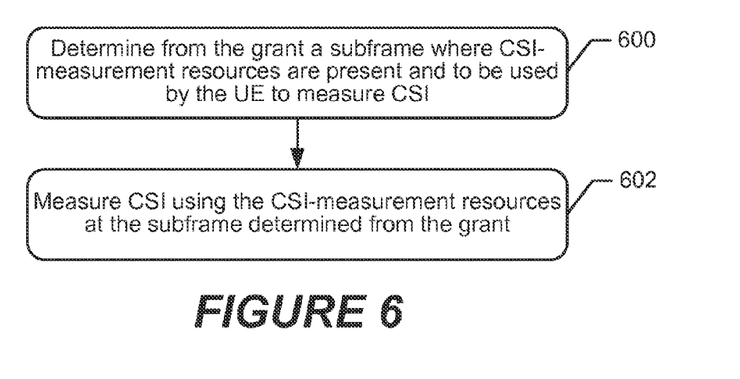

In the embodiment of FIG. 6, a subframe where CSI-measurement resources are present and to be used by the UE to measure CSI is determined (block 600) from the grant, and the CSI is measured (block 602) using the CSI-measurement resources at the subframe identified by the grant.

Figure 7:
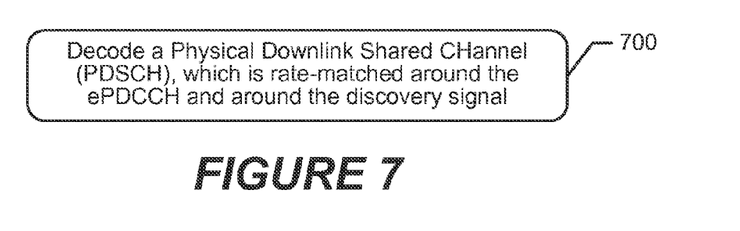

In the embodiment of FIG. 7, a Physical Downlink Shared CHannel (PDSCH) is decoded (block 700), where the PDSCH can be rate-matched around the ePDCCH and around the discovery signal.

Example User Equipment and Network Node

Figure 8:
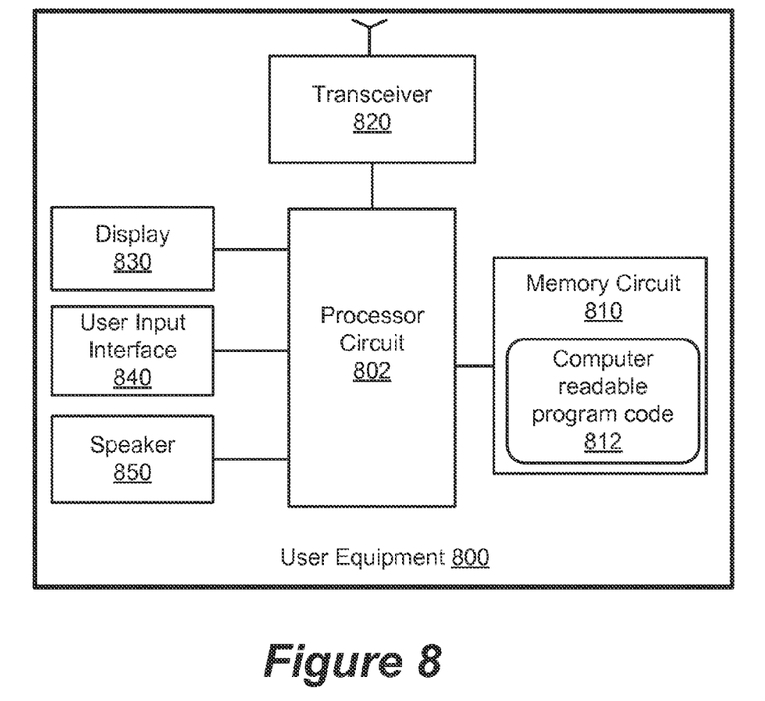
FIG. 8 is a block diagram of a UE configured according to some embodiments.

FIG. 8 is a block diagram of a UE 800, for use in a telecommunications system that is configured to perform operations according to one or more embodiments disclosed herein. The UE 800 includes a transceiver 820, a processor circuit 802, and a memory circuit 810 containing computer-readable program code 812. The UE 800 may further include a display 830, a user-input interface 840, and a speaker 850.

The transceiver 820 is configured to communicate with a network node, the example of which is an eNB, through a wireless air interface using one or more of the radio-access technologies disclosed herein. The processor circuit 802 may include one or more data-processing circuits, such as a general-purpose at special-purpose processor, e.g., microprocessor and/or digital signal processor. The processor circuit 802 is configured to execute the computer-readable program code 812 in the memory 810 to perform at least some of the operations described herein as being performed by a UE.

Figure 9:
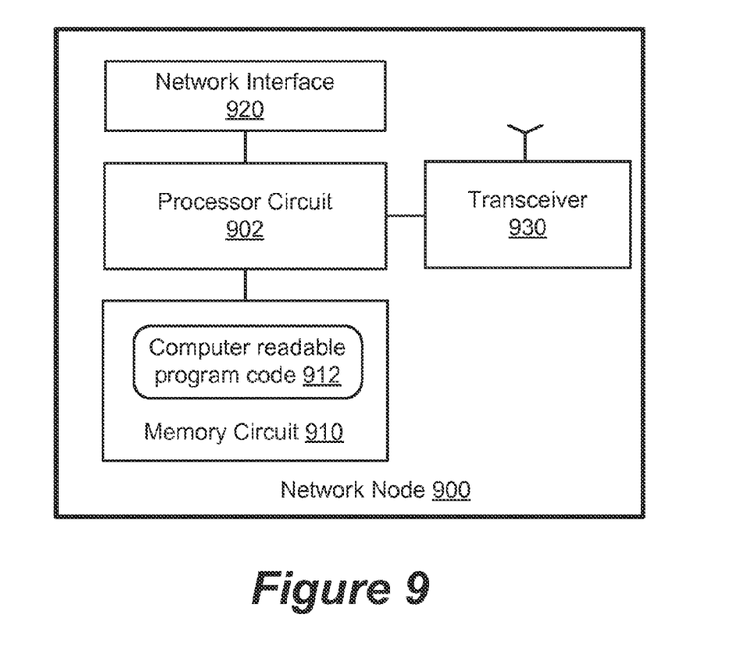
FIG. 9 is a block diagram of a network node configured according to some embodiments.

FIG. 9 is a block diagram of a network node 900, for use in a telecommunications system that is configured according to one or more embodiments disclosed herein for an eNB, radio network node, or other network node. The network node 900 can include a transceiver 930, a network interface 920, a processor circuit 902, and a memory circuit 910 containing computer-readable program code 912.

The transceiver 930 is configured to communicate with the UE 800 using one or more of the radio-access technologies disclosed herein, when the network node 900 is a radio network node. The processor circuit 902 may include one or more data-processing circuits, such as a general-purpose and/or special-purpose processor, e.g., microprocessor and/or digital signal processor that may be collocated or distributed across one or more networks. The processor circuit 902 is configured to execute the computer-readable program code 912 in the memory 910 to perform at least some of the operations and methods of described herein as being performed by a network node (e.g., eNB). The network interface 920 communicates with other network nodes and/or a core network.

Figure 10:
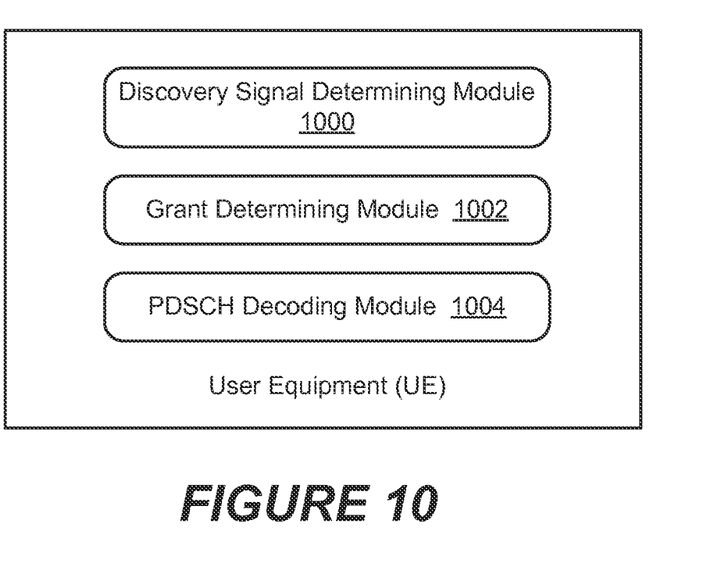
FIG. 10 is a block diagram of functional modules that may be implemented within a UE according to some embodiments.

FIG. 10 illustrates modules residing in a UE, such as the UE 800 of FIG. 8, that perform operations as disclosed herein according to some embodiments. The UE includes a discovery-signal determining module 1000, a grant-determining module 1002, and a data-decoding module 1004. The discovery signal-determining module 1000 determines whether a discovery signal was received from a network node based on detection of another signal received from the network node. The another signal may be a PSS and/or a SSS. Based on detecting the another signal was received, the grant-determining module 1002 responsively determines whether a grant is present based on processing an ePDCCH. Based on determining that a grant is present, the data-decoding module 1004 responsively decodes a PDSCH using the ePDCCH and the discovery signal. The modules 1000, 1002, and 1004 may perform other operations by a UE disclosed herein with regard to FIGS. 1-7.

ABBREVIATIONS

CSI Channel-State Information
CSI-RS Channel-State Information Reference Signal
ePDCCH Evolved Physical Downlink Control CHannel
eNB LTE base station
eSS extended Synchronization Signal
LTE Long-Term Evolution
LAA-LTE Licensed-Assisted Access LTE
LBT Listen Before Talk
PDSCH Physical Downlink Shared CHannel
PSS Primary Synchronization Signal
SF SubFrame
SFN System Frame Number
SSS Secondary Synchronization Signal
UE User Equipment Further Definitions and Embodiments In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a More general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general-purpose computer circuit, special-purpose computer circuit, and/or other programmable data-processing circuit to produce a machine, such that the instructions, which execute via the processor of the computer and/or other programmable data-processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible non-transitory computer-readable medium that can direct processor of a computer or other programmable data-processing apparatus to function in a particular manner, such that the instructions stored in the computer-readable medium produce an article of manufacture including instructions which implement the functions/acts specified in the block diagrams and/or flowchart block or blocks.

A tangible non-transitory computer-readable medium may include an electronic, magnetic, optical, electromagnetic, or semiconductor data-storage system, apparatus, or device. More specific examples of the computer-readable medium would include the following: a portable computer diskette, a random-access memory (RAM) circuit, a read-only memory (ROM) circuit, an erasable programmable read-only memory (EPROM or Flash memory) circuit, a portable compact disc memory (CD-ROM), and a portable digital video disc memory (DVD/BlueRay).

The computer program instructions may also be loaded onto a computer and/or other programmable data-processing apparatus to cause a series of operational steps to be performed by a processor of the computer and/or other programmable apparatus to produce a computer-implemented process such that the instructions which execute on the computer or other programmable apparatus provide steps for implementing the functions/acts specified in the block diagrams and/or flowchart block or blocks. Accordingly, inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the appended examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the following examples of embodiments and their equivalents, and shall not be restricted or limited by the foregoing detailed description.

The invention claimed is:

1. A method by a user equipment, UE, for decoding data from a network node in a telecommunications system, the method comprising:
   determining whether a discovery signal was received from the network node on an unlicensed frequency band based on detection of a component of a discovery signal received from the network node on the unlicensed frequency band;
   based on detecting that the component of the discovery signal was received, determining whether a grant is present based on processing an Evolved Physical Downlink Control CHannel, ePDCCH on a licensed frequency band; and
   based on determining that a grant is present, decoding a Physical Downlink Shared Channel, PDSCH, using the ePDCCH and the discovery signal, wherein decoding the PDSCH using the ePDCCH and the discovery signal comprises decoding the PDSCH, which is rate-matched around the ePDCCH and around the discovery signal.

2. The method of claim 1, wherein determining whether the discovery signal was received from the network node based on detection of the component of the discovery signal received from the network node comprises:
   determining whether the discovery signal was received from the network node based on detection of a Primary Synchronization Signal, PSS, and/or a Secondary Synchronization Signal, SSS, as the component of the discovery signal received from the network node.

3. The method of claim 1, further comprising:
   carrying out the determining whether the discovery signal was received from the network node responsive to occurrence of each SubFrame.

4. The method of claim 1, further comprising:
   carrying out the determining whether the discovery signal was received from the network node continuously without timing referenced to any SubFrame.

5. The method of claim 1, wherein the determining whether the grant is present based on processing the ePDCCH, comprises:
   blindly decoding the ePDCCH, which is rate-matched around the discovery signal.

6. The method of claim 5, further comprising:
   determining from the grant a subframe where CSI-measurement resources are present and to be used by the UE to measure Channel-State Information, CSI.

7. The method of claim 6, further comprising:
   measuring CSI using the CSI-measurement resources at the subframe determined from the grant.

8. The method of claim 1 further comprising blindly decoding the ePDCCH when the component of the discovery signal is not detected.

9. A user equipment, UE, operating in a telecommunications system, the UE comprising:
   a transceiver configured to provide radio communications with a network node of the telecommunications system; and
   a processor coupled to the transceiver, wherein the processor is configured to,
      determine whether a discovery signal was received from the network node on an unlicensed frequency band through the transceiver based on detection of a component of a discovery signal received from the network node on the unlicensed frequency band;
      based on detecting that the component of the discovery signal was received, determine whether a grant is present based on processing an Evolved Physical Downlink Control CHannel, ePDCCH on a licensed frequency band; and
      based on determining that a grant is present, decode a Physical Downlink Shared Channel, PDSCH, using the ePDCCH and the discovery signal, wherein decoding the PDSCH using the ePDCCH and the discovery signal comprises decoding the PDSCH, which is rate-matched around the ePDCCH and around the discovery signal.

10. The UE of claim 9, wherein the processor is further configured to carry out the determining whether the discovery signal was received from the network node through the transceiver based on detection of a Primary Synchronization Signal, PSS, and/or a Secondary Synchronization Signal, SSS, as the component of the discovery signal received from the network node.

11. The UE of claim 9, wherein the processor is further configured to:
   carry out the determining whether the discovery signal was received from the network node through the transceiver responsive to occurrence of each SubFrame.

12. The UE of claim 9, wherein the processor is further configured to:
   carry out the determining whether the discovery signal was received from the network node through the transceiver continuously without timing referenced to any SubFrame.

13. The UE of claim 9, wherein the determining whether the grant is present based on processing the ePDCCH, comprises:
   blindly decoding the ePDCCH, which is rate-matched around the discovery signal.

14. The UE of claim 9, wherein the processor is further configured to:
   determine from the grant a subframe where CSI-measurement resources are present and to be used by the UE to measure Channel-State Information, CSI.

15. The UE of claim 14, wherein the processor is further configured to:
   measure CSI using the CSI-measurement resources at the subframe determined from the grant.

16. The UE of claim 9 wherein the processor is further configured to blindly decode the ePDCCH when the component of the discovery signal is not detected.

17. A user equipment, UE, operating in a telecommunications system, wherein the UE is adapted to:
   determine whether a discovery signal was received from the network node through the transceiver based on detection of a component of a discovery signal received from the network node;
   based on detecting that the component of the discovery signal was received, determine whether a grant is present based on processing an Evolved Physical Downlink Control CHannel, ePDCCH; and
   based on determining that the grant is present, decode a Physical Downlink Shared Channel, PDSCH, using the ePDCCH, and the discovery signal, wherein decoding the PDSCH using the ePDCCH and the discovery signal comprises decoding the PDSCH, which is rate-matched around the ePDCCH and around the discovery signal.

18. The UE of claim 17, wherein the UE is adapted to carry out the determining whether the discovery signal was received from the network node through the transceiver based on detection of a Primary Synchronization Signal, PSS, and/or a Secondary Synchronization Signal, SSS, as the component of the discovery signal received from the network node.

19. The UE of claim 17, wherein the UE is further adapted to blindly decode the ePDCCH when the component of the discovery signal is not detected.

* * * * *